United States Patent [19]
Humber

[11] Patent Number: 5,702,076
[45] Date of Patent: Dec. 30, 1997

[54] INSULATOR FOR MOUNTING PIPE IN METAL WALL STUD

[75] Inventor: Jeffrey A. Humber, Memphis, Tenn.

[73] Assignee: IPS Corporation, Collierville, Tenn.

[21] Appl. No.: 629,063

[22] Filed: Apr. 8, 1996

Related U.S. Application Data

[63] Continuation of Ser. No. 298,454, Aug. 30, 1994, abandoned.

[51] Int. Cl.$^6$ ........................ F16L 5/00
[52] U.S. Cl. ............ 248/57; 248/56; 248/74.2
[58] Field of Search ............... 248/57, 56, 62, 248/71, 74.2, 604, 73, 27.3

[56] References Cited

U.S. PATENT DOCUMENTS

| | | | |
|---|---|---|---|
| 2,140,441 | 12/1938 | Clark | 248/56 |
| 2,140,443 | 12/1938 | Clark | 248/56 |
| 3,164,873 | 1/1965 | Marek | 248/27.3 |
| 3,193,613 | 7/1965 | Van Buren, Jr. | 248/56 |
| 4,192,477 | 3/1980 | Decky et al. | 248/56 |
| 4,299,363 | 11/1981 | Datschefski | 248/56 |
| 4,442,994 | 4/1984 | Logsdon | 248/547 |
| 4,839,937 | 6/1989 | Oikawa et al. | 248/56 |
| 4,903,921 | 2/1990 | Logsdon | 248/74.5 |
| 4,930,733 | 6/1990 | Logsdon | 248/56 |
| 5,090,644 | 2/1992 | Lenker | 248/56 |

*Primary Examiner*—Ramon O. Ramirez
*Assistant Examiner*—Anita M. King
*Attorney, Agent, or Firm*—Baker, Maxham, Jester & Meador

[57] ABSTRACT

An insulator is designed to mount ⅜, ½ or ¾ inch pipe in a hole through a sheet metal wall stud. The pipe insulator includes a generally cylindrical body that fits within a circular hole pre-punched in the intermediate planar portion of the sheet metal wall stud. The body has a circular, radially extending mounting flange which is held against the periphery of the hole in the sheet metal stud by a plurality of axially extending, circumferencially spaced mounting fingers formed in the cylindrical body. These mounting fingers momentarily deflect out of the way and then snap back into position when the cylindrical body is forced into the hole in the sheet metal stud. The pipe insulator further includes axially spaced sets of pie-shaped pipe gripping segments which extend radially inwardly from the cylindrical body and bend a sufficient amount to permit passage of the pipe through the center of the cylindrical body while holding the pipe rigidly in position. The pie-shaped gripping elements are resilient and flexible and accommodate the three different sizes of pipe.

12 Claims, 2 Drawing Sheets

INSULATOR FOR MOUNTING PIPE IN METAL WALL STUD

This application is a continuation of application Ser. No. 08/298,454, filed Aug. 30, 1994, now abandoned.

BACKGROUND OF THE INVENTION

The present invention relates to plumbing installations in buildings, and more particularly, to a flexible plastic insulator designed to be inserted in a hole pre-punched in a metal wall stud for supporting a water pipe.

For many years sheet metal studs have been used to support dry wall in the construction of interior walls when tenant improvements are made in office buildings. Metal wall stud construction is particularly advantageous from the standpoint of fire resistance. The continuing imposition of logging restrictions as a result of the environmental movement has substantially increased the cost of lumber in the United States of America. Accordingly, metal wall studs are being used on an increasing basis in residential construction. It is necessary to provide an insulator for mounting copper, PVC, CVPC, polybutylene and other pipe through a hole normally pre-punched in the intermediate planar portion of a sheet metal wall stud. The insulator should provide a mechanical support that eliminates the noise of water hammer. In the case of Copper water pipe, the insulator should eliminate galvanic action that might otherwise occur between the pipe and metal wall stud.

U.S. Pat. No. 4,192,477 of Decky, et at. discloses a resilient pipe insulator for mounting pipe through a hole pre-punched in a metal wall stud. The Decky, et al. insulator has been extensively commercialized under the trademark PIPE-TYTES. It comprises an outer split cylindrical body with a raised barrier wall at one end that it held against the stud by circumferentially spaced flanges. Rib-like members support an interior wall defining a circular pipe-receiving passage having a central axis that is offset from the central axis of the outer split cylindrical body. This permits a series of such insulators in adjacent metal studs to be rotated for axially aligning their pipe receiving passages. The PIPE-TYTES insulator embodying the invention of the aforementioned '477 Decky, et al. patent is quite serviceable, with one major exception. It does not accommodate sizing variations both as to the diameter of the hole in the stud and the outer diameter of the pipe to be mounted. Therefore a different size insulator must be used for each hole size and each pipe size. It would be desirable to provide plumbers with the convenience of using a single insulator that would accommodate variations in mounting hole diameter and pipe diameter. Such an insulator must be easy to mount, low cost and durable while providing a firm mount to absorb and dampen vibrations in the pipe.

SUMMARY OF THE INVENTION

Accordingly, the present invention provides an insulator designed to mount ⅜, ½ or ¾ inch pipe in a hole through a sheet metal wall stud. The pipe insulator includes a generally cylindrical body that fits within a circular hole pre-punched in the intermediate planar portion of the sheet metal wall stud. The body has a circular, radially extending mounting flange which is held against the periphery of the hole in the sheet metal stud by a plurality of axially extending, circumferencially spaced mounting fingers formed in the cylindrical body. These mounting fingers momentarily deflect out of the way and then snap back into position when the cylindrical body is forced into the hole in the sheet metal stud. The pipe insulator further includes axially spaced sets of pie-shaped pipe gripping segments which extend radially inwardly from the cylindrical body and bend a sufficient amount to permit passage of the pipe through the center of the cylindrical body while holding the pipe rigidly in position. The pie-shaped gripping elements are resilient and flexible and accommodate different sizes of pipe.

DETAILED DESCRIPTION OF THE PREFERRED EMBODIMENT

Figure 1:
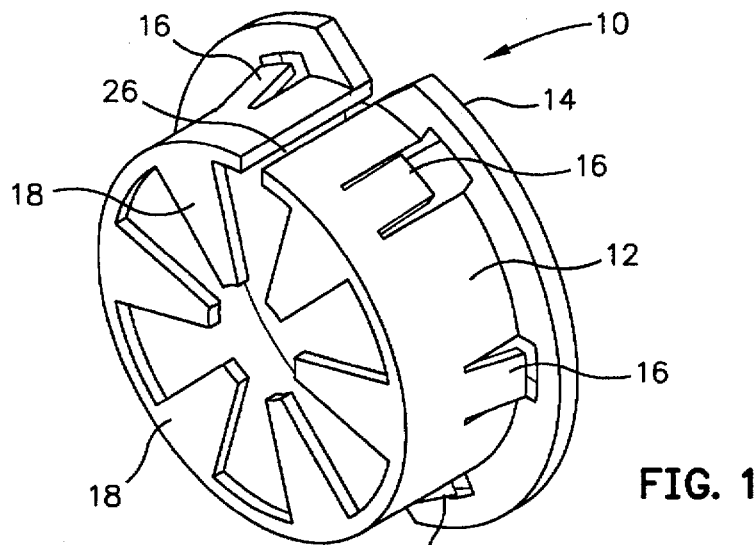
FIG. 1 is a perspective view of a preferred embodiment of my pipe insulator. In this figure, only the front set of pie-shaped pipe gripping segments have been illustrated, but not the rear set, for the sake of clarity.

Referring to FIG. 1, a preferred embodiment of my pipe insulator 10 comprises a generally cylindrical hollow body 12 having a radially extending mounting flange 14 at a rear end. A plurality of axially extending mounting fingers 16 are formed in the cylindrical body 12 at circumferentially spaced locations. My pipe insulator 10 further comprises axially spaced sets of identical generally planar pie-shaped pipe gripping segments 18 and 20 (FIGS. 1–3 and 8) which extend radially inwardly from the cylindrical body 12. The distal inner ends of the pipe gripping segments 18 and 20 define a circular pipe receiving passage 22 (FIGS. 2 and 3) having a central axis which coincides with the central axis of the surrounding cylindrical body 12. My pipe insulator 10 is preferably injection molded from suitable plastic material so that the fingers 16 and pipe gripping segments 18 and 20 are flexible and resilient. The pipe gripping segments 18 and 20 are bendable a sufficient mount to permit passage of a pipe P (FIG. 6) through the passage 22 while holding the pipe rigidly in position.

The outer diameter of the cylindrical body 12 is sized so that it will fit snugly within a hole punched in the intermediate planar portion 24a (FIG. 6) of a sheet metal wall stud 24. Preferably, the outer diameter of the cylindrical body 12 will fit within a hole in the metal stud 24 having a diameter of either 1 and 11/32 inches or 1 and ⅜ inches. The outer diameter of the mounting flange 14 is preferably significantly in excess of the aforementioned dimensions so that the mounting flange 14 will overlap the periphery of the planar portion 24a defining the hole in stud as best seen in FIG. 7.

Figure 4:
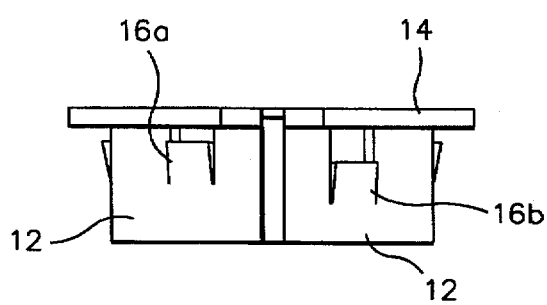
FIG. 4 is a top elevation view of the preferred embodiment of my pipe insulator.
Figure 5:
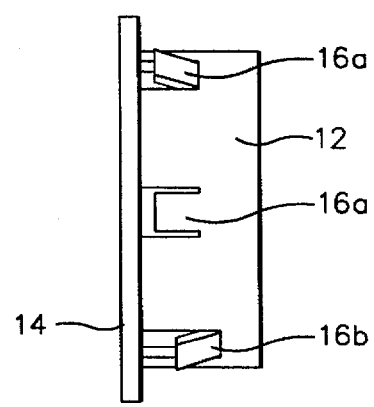
FIG. 5 is a side elevation view of the preferred embodiment of my pipe insulator.

The mounting fingers 16 (FIG. 1) are formed so that they extend both axially, and angularly outwardly in a radial direction moving rearwardly toward the mounting flange 14. Upon insertion of the cylindrical body 12 into the hole in the metal stud, the distal ends of the mounting fingers 16 can deflect inwardly and then spring back outwardly to the positions illustrated in FIG. 7 in order to firmly hold the mounting flange 14 against the planar portion 24a of the metal stud. As best seen in FIGS. 4 and 5, some of the mounting fingers 16a are longer than the other mounting fingers 16b, allowing my pipe insulator 10 to accommodate different thicknesses of the intermediate planar portion 24a of the metal stud 24.

The cylindrical body 12 is split by reason of an axially extending slot 26 (FIG. 1). This permits the front end of the cylindrical body (to the left in FIG. 1) to be compressed to slightly reduce its diameter to facilitate insertion into the hole in the metal stud 24. One of the pie-shaped pipe gripping segments 20' (FIG. 3) spans the slot 26 and limits the compression of the rear end of the pipe insulator 10.

Figure 6:
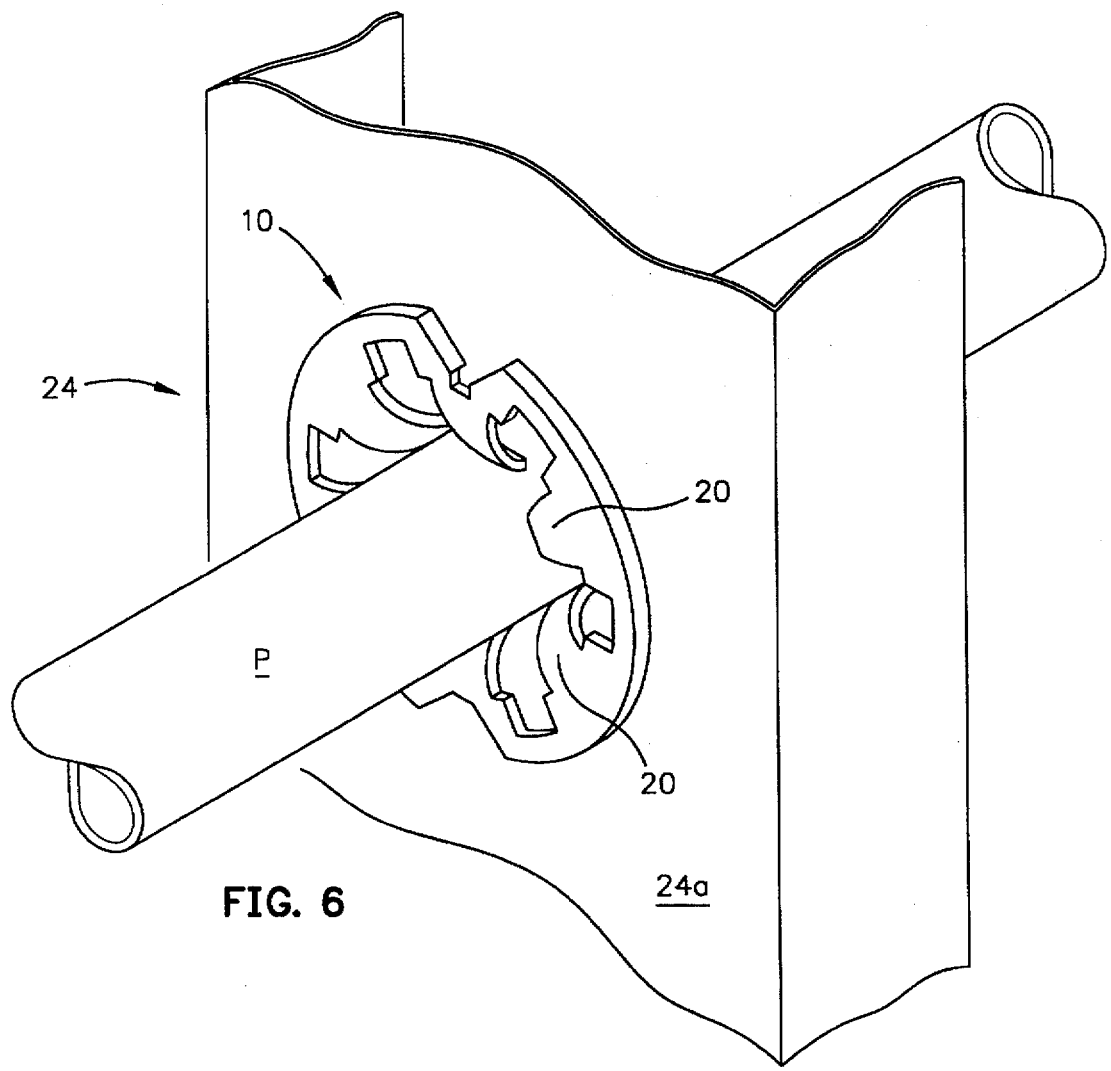
FIG. 6 is a perspective view of the preferred embodiment of my pipe insulator installed in a hole through a sheet metal wall stud with a pipe inserted through the insulator.
Figure 7:
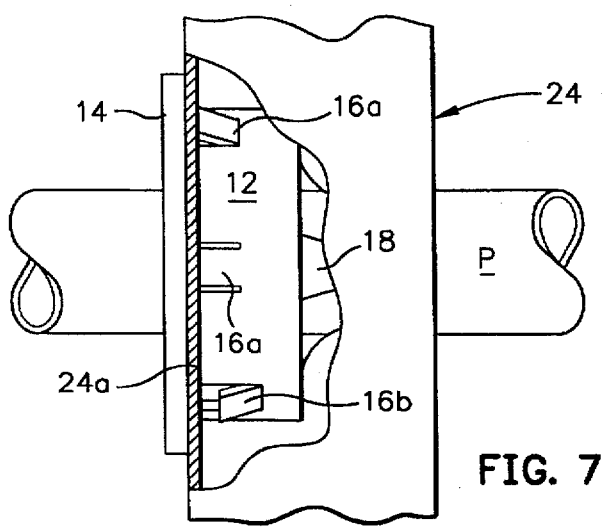
FIG. 7 is a side elevation view of the installation of FIG. 6 with portions broken away to illustrate the mounting fingers of the insulator holding the mounting flange against the periphery of the hole in the sheet metal stud.
Figure 8:
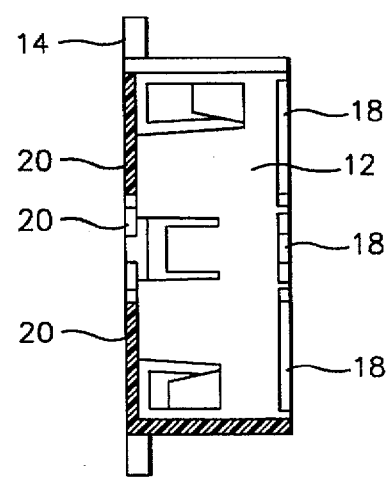
FIG. 8 is a sectional view of the preferred embodiment of my pipe insulator taken along line 8—8 of FIG. 2.

FIGS. 6 and 7 illustrate a plumbing installation in which the preferred embodiment of my pipe insulator 10 has been utilized to mount a pipe P through the intermediate planar portion 24a of a metal wall stud 24. During construction, the plumber first punches aligned holes in adjacent metal studs and then snaps respective insulators 10 into the same. A pipe P is then pushed through the central passage 22 of each of the pipe insulators, causing their pie-shaped pipe gripping segments 18 and 20 to bend.

Figure 2:
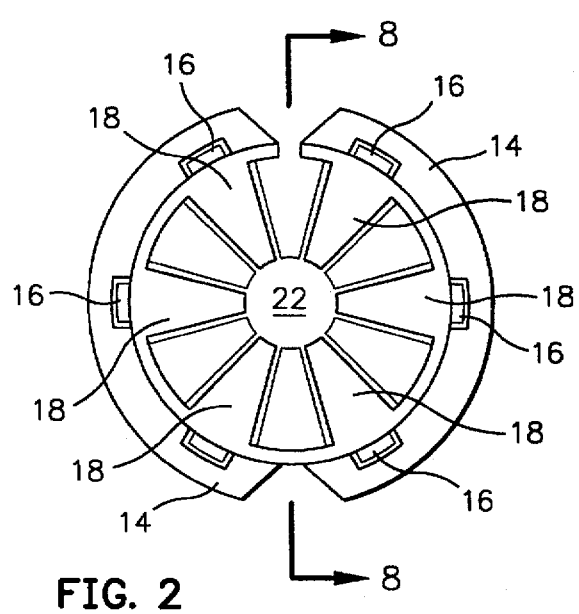
FIG. 2 is front elevation view of the preferred embodiment of my pipe insulator.
Figure 3:
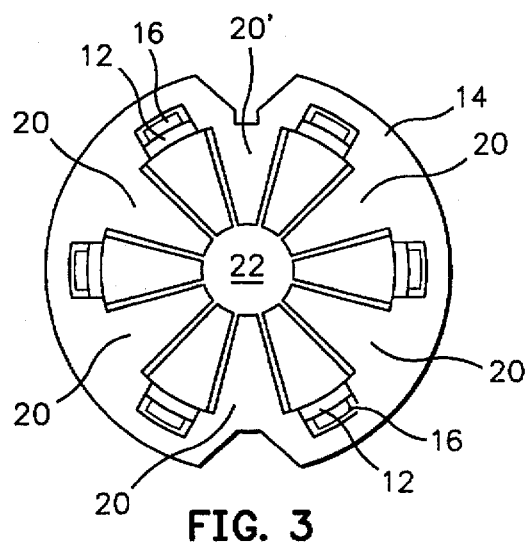
FIG. 3 is a rear elevation view of the preferred embodiment of my pipe insulator.

The pipe gripping segments 18 and 20 are rotationally offset as shown in FIGS. 2 and 3. Each segment 20 overlaps a gap between two adjacent segments 18.

As previously mentioned, the pipe insulator 10 is preferably injection molded as a single unitary article out of a suitable plastic that provides the desired degree of flexibility and resilience of the pipe gripping segments 18 and 20. Examples of such plastics are polyethylene, polypropylene and blends of these two plastics.

The preferred embodiment of my insulator 10 is designed to mount ⅜, ½ or ¾ inch pipe. I have found that this can be readily achieved with a cylindrical body 12 having an outer diameter slightly smaller than 1 and 11/32 of an inch and in which the pie-shaped pipe gripping segments 18 and 20 each measure slightly less than one-half inch from the inner distal end to the outer annular wall of the cylindrical body 12. In the aforementioned example, the pipe receiving passage 22, when the pipe gripping segments 18 and 20 are not deflected, measures slightly less then ⅜ of an inch in diameter. Thus, the segments 18 and 20 deflect only a minute amount when a ⅜ inch pipe is inserted.

While I have described a preferred embodiment of my insulator for mounting pipe in a metal wall stud, it will be apparent to those skilled in the art that my invention may be modified in both arrangement and detail. For example, the pipe gripping segment 20' (FIG. 3) can be eliminated so that the insulator can be snapped over the outside of the pipe P. In addition, axial fins (not illustrated) can be formed at circumferential locations about the annular wall of the cylindrical body 12 so that they extend in a radial direction to permit the pipe insulator to be installed in a hole drilled through a wooden stud. Therefore, the protection afforded by my invention should only be limited in accordance with the following claims.

I claim:

1. An insulator for mounting pipe in a hole through a sheet metal stud, the insulator comprising:

a generally cylindrical body sized to fit within a variably sized hole pre-punched in an intermediate planar portion of a sheet metal wall stud, wherein the cylindrical body is split with an axial slot, the slot having a flange end and a distal end, wherein the flange end of the axial slot is bridged by one of the pipe gripping segments, thereby preventing the cylindrical body from being opened;

a mounting flange extending radially from the cylindrical body for overlying a periphery of the intermediate planar portion of the sheet metal wall stud surrounding the hole;

a plurality of mounting fingers extending from the cylindrical body and spaced from the mounting flange for holding the flange against the periphery of the intermediate planar portion of the sheet metal wall stud surrounding the hole, the mounting fingers having different spacings from the mounting flange to accommodate different thicknesses of the intermediate planar portion of the sheet metal wall stud and radially protruding a sufficient distance from the cylindrical body to accommodate the variably sized hole pre-punched in the intermediate planar portion of the sheet metal wall stud; and a plurality of pipe gripping segments which extend radially inwardly from the cylindrical body toward a center line of the body and are bendable a sufficient amount to permit passage of a pipe having a predetermined diameter through the center of the cylindrical body while holding the pipe rigidly in position.

2. The insulator according to claim 1 wherein the pipe gripping elements are made of a resilient and flexible material to accommodate different sizes of pipe.

3. The insulator according to claim 1 wherein the mounting fingers are made of a resilient and flexible material.

4. The insulator according to claim 1 wherein the insulator is molded as a single unitary article made of a plastic material.

5. The insulator according to claim 1 wherein there are two axially spaced sets of pipe gripping elements.

6. The insulator according to claim 1 wherein the pipe gripping segments are pie-shaped.

7. The insulator according to claim 1 wherein the mounting fingers extend axially and angularly outwardly in a radial direction.

8. The insulator according to claim 1 wherein the pipe gripping segments are pie-shaped and have distal ends defining a pipe receiving passage.

9. An insulator for mounting pipe in a hole through a sheet metal wall stud, the insulator being injection molded as a single unitary article out of a suitable plastic, comprising:

a cylindrical body sized to fit within a hole pre-punched in the intermediate planar portion of a sheet metal wall stud, said hole measuring approximately 1 and 11/32 of an inch;

a circular mounting flange extending radially outwardly from a rear end of the cylindrical body for overlying a periphery of the intermediate planar portion of the sheet metal wall stud surrounding the hole;

a plurality of generally planar flexible resilient mounting fingers extending axially and angularly outwardly from the cylindrical body moving toward the circular mounting flange and spaced from the mounting flange for holding the flange against the periphery of the intermediate planar portion of the sheet metal wall stud surrounding the hole; and two axially spaced sets of flexible and resilient pie-shaped pipe gripping segments which extend radially inwardly from the cylindrical body and have distal ends defining a central pipe receiving passage, the pipe gripping elements capable of bending a sufficient amount to permit passage of the pipe through the center of the cylindrical body while holding the pipe rigidly in position, the pipe gripping segments of each set being rotationally offset from each other.

10. An insulator for mounting a pipe in a hole through a sheet metal wall stud, comprising;

a generally cylindrical body;

a mounting flange extending radially from the cylindrical body;

a plurality of mounting fingers extending from the cylindrical body and having multiple different spacings from the mounting flange;

a first set of coplanar resilient pie-shaped pipe gripping segments extending radially inwardly from the cylindrical body and having distal ends defining a substantially circular first passage; and a second set of resilient pie-shaped pipe gripping segments spaced from the first set along the cylindrical body and extending radially inwardly from the cylindrical body, the pipe gripping segments of the first and second sets being rotationally offset from each other.

11. An insulator for mounting pipe in a hole through a sheet metal wall stud, comprising:

a generally cylindrical body;

a mounting flange extending radially from the cylindrical body;

a plurality of mounting fingers extending from the cylindrical body and having multiple different spacings from the mounting flange;

a first set of resilient pie-shaped pipe gripping segments extending radially inwardly from the cylindrical body and having distal ends defining a substantially circular first passage; and a second set of resilient pie-shaped pipe gripping segments spaced from the first set along the cylindrical body, extending radially inwardly from the cylindrical body, wherein the pipe gripping segments of the first and second sets are rotationally offset from each other.

12. An insulator for mounting pipe in a hole through a sheet metal wall stud, comprising:

a generally cylindrical body;

a mounting flange extending radially from the cylindrical body;

a plurality of mounting fingers extending from the cylindrical body and having multiple different spacings from the mounting flange;

a first set of resilient substantially coplanar pie-shaped pipe gripping segments extending radially inwardly from the cylindrical body and having distal ends defining a substantially circular first passage; and a second set of resilient pie-shaped pipe gripping segments spaced from the first set along the cylindrical body, extending radially inwardly from the cylindrical body, wherein the pipe gripping segments of the first and second sets are rotationally offset from each other.

* * * * *